Oct. 18, 1938.  L. A. MOLIN  2,133,463
SAUSAGE LINKING MACHINE
Filed Aug. 24, 1935  4 Sheets-Sheet 1
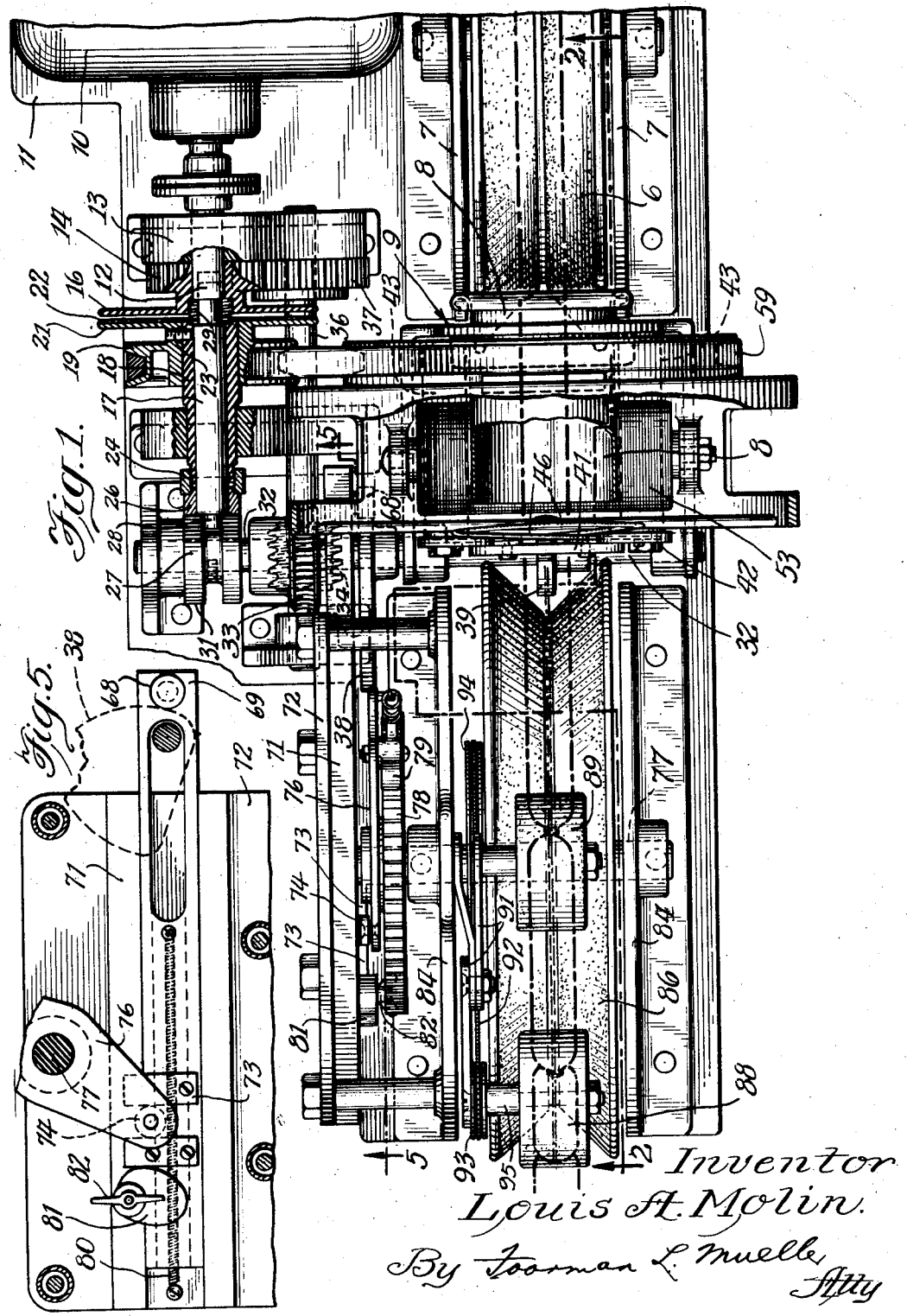
Inventor
Louis A. Molin.
By Toorman L. Mueller
Atty Oct. 18, 1938.  L. A. MOLIN  2,133,463
SAUSAGE LINKING MACHINE
Filed Aug. 24, 1935  4 Sheets-Sheet 2
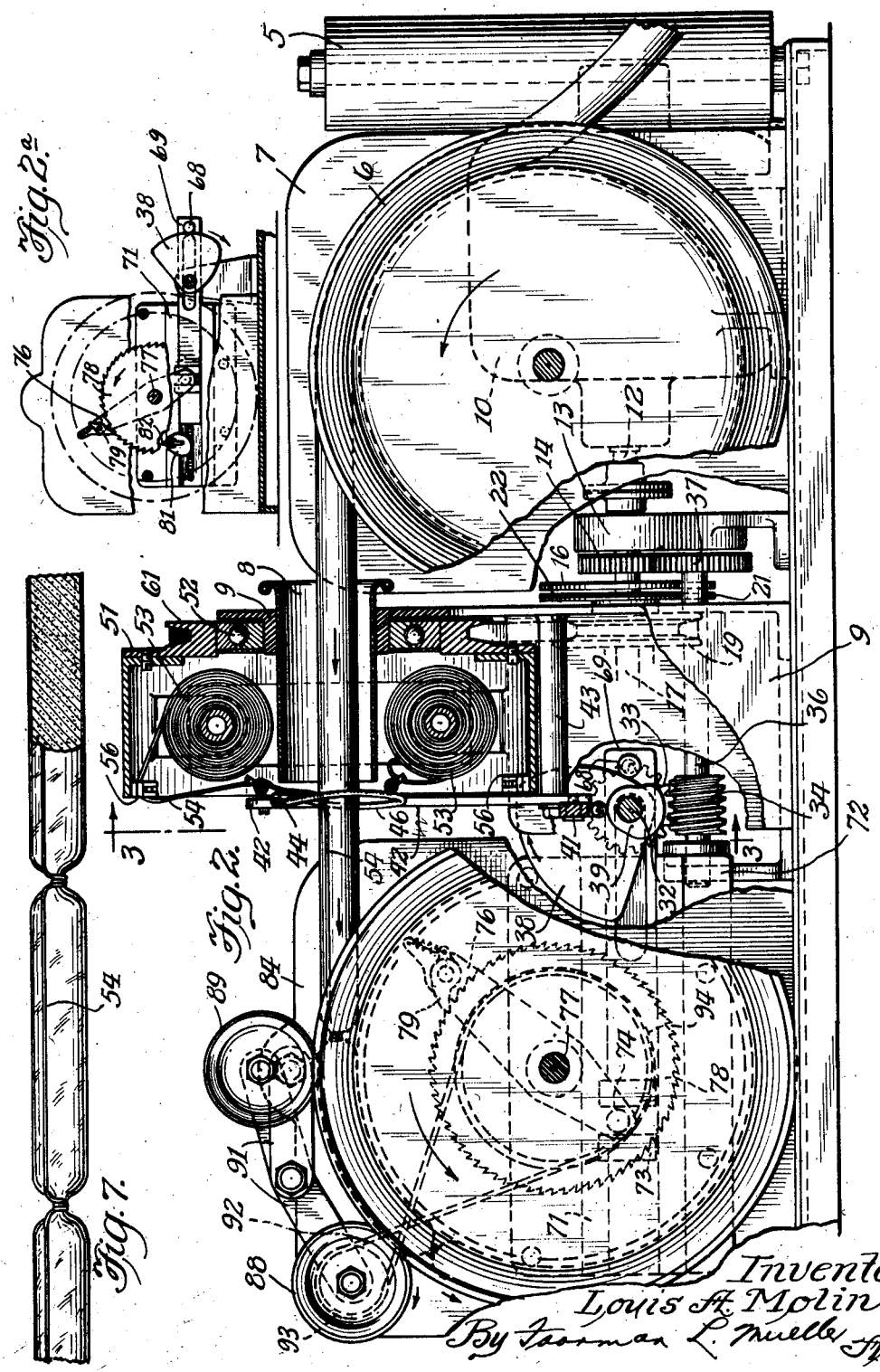

Oct. 18, 1938.   L. A. MOLIN   2,133,463
SAUSAGE LINKING MACHINE
Filed Aug. 24, 1935   4 Sheets-Sheet 3
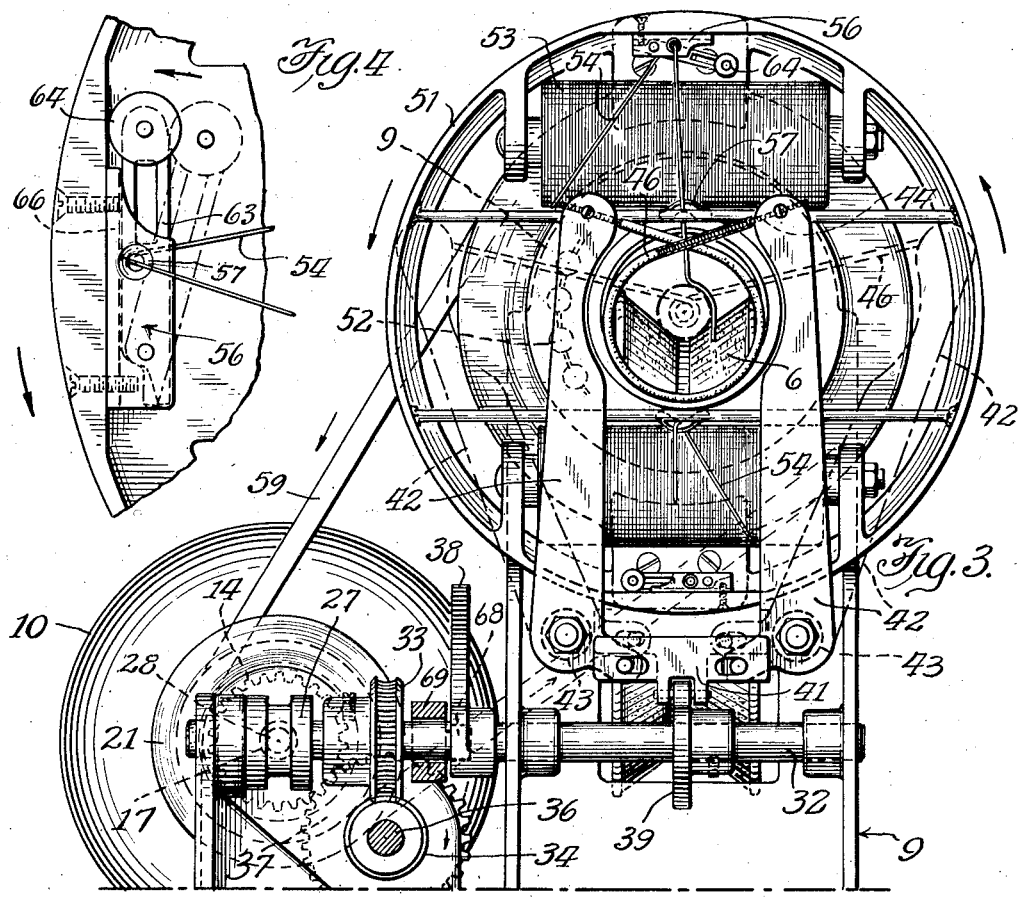
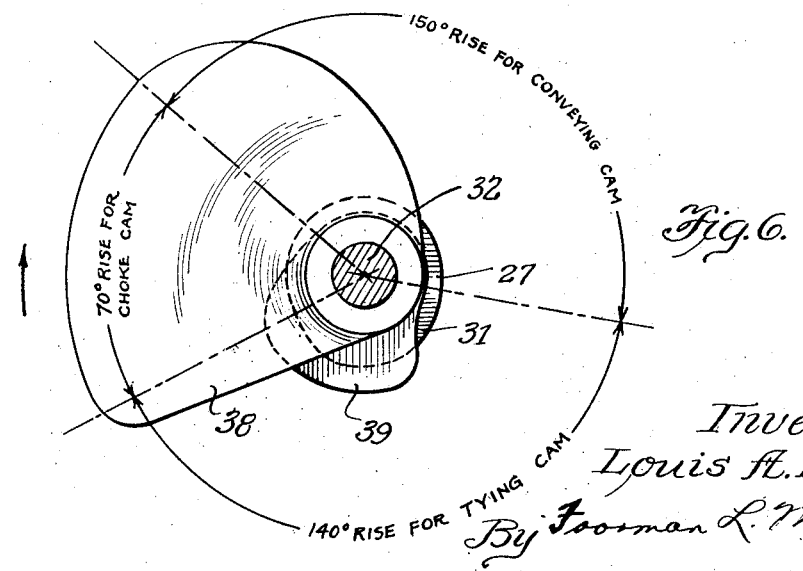
Inventor
Louis A. Molin.

Oct. 18, 1938.　　　L. A. MOLIN　　　2,133,463
SAUSAGE LINKING MACHINE
Filed Aug. 24, 1935　　　4 Sheets-Sheet 4

Inventor
Louis A. Molin
By Foorman L. Mueller
Atty.

Patented Oct. 18, 1938

2,133,463

UNITED STATES PATENT OFFICE 2,133,463

SAUSAGE-LINKING MACHINE

Louis A. Molin, Chicago, Ill., assignor to Visking Corporation, Chicago, Ill., a corporation of Virginia Application August 24, 1935, Serial No. 37,661

20 Claims. (Cl. 17—34)

This invention relates to sausage linking machines and has been illustrated as embodied in a machine into which the long filled sausage casing is fed and which at the usual intervals chokes the casing to form linked sausages and ties the casing with string to retain the sausage formation.

In the past many sausage linking machines have been proposed and some have proved at least experimentally operative. In fact, a very small percentage of sausages have been linked by machine commercially. All of the machines of the prior art, however, are handicapped in one or more particulars from the commercial standpoint, and chief among these is a tendency of the machines to break the thin casings so often that the waste made the use of the machines too expensive. Another difficulty with past machines has been that, since they linked the sausages by twisting one sausage with respect to another, the sausages could be unlinked simply by untwisting. This untwisting often occurred during the smoking period. If a heavy casing were used in an effort to avoid breakage, it was not only less desirable from the sales standpoint, but the twisting became more difficult and untwisting more probable.

The present invention solves this long recognized problem by choking the casing with a soft, flexible loop which is drawn tight around the casing and by tying the choked portion with string rather than twisting the sausage. This has the additional advantage of economy, since the length of casing used up by the choked and tied separation is much less than the length of casing used by the old twist separation.

Other advantages will be apparent from the following description and from the accompanying drawings, wherein Fig. 1 is a plan view, partially broken away, of the embodiment of the invention chosen for illustration.

Fig. 2 is a longitudinal view, partly in section, approximately along the line 2—2 of Fig. 1, and also partially broken away.

Fig. 2a is a view on a reduced scale of portions of the apparatus as they would be seen in Fig. 2, if not obscured by other parts.

Fig. 3 is a transverse sectional view taken along the line 3—3 of Fig. 2.

Fig. 4 is a detailed view of the string-tensioning device in operated position.

Fig. 5 is a fragmentary view of the actuating device for the feed roll.

Fig. 6 is a detailed diagrammatic view of the control cams showing their sequence of operations.

Fig. 7 is a view showing the linked sausage as completed by the machining.

Figure 8:
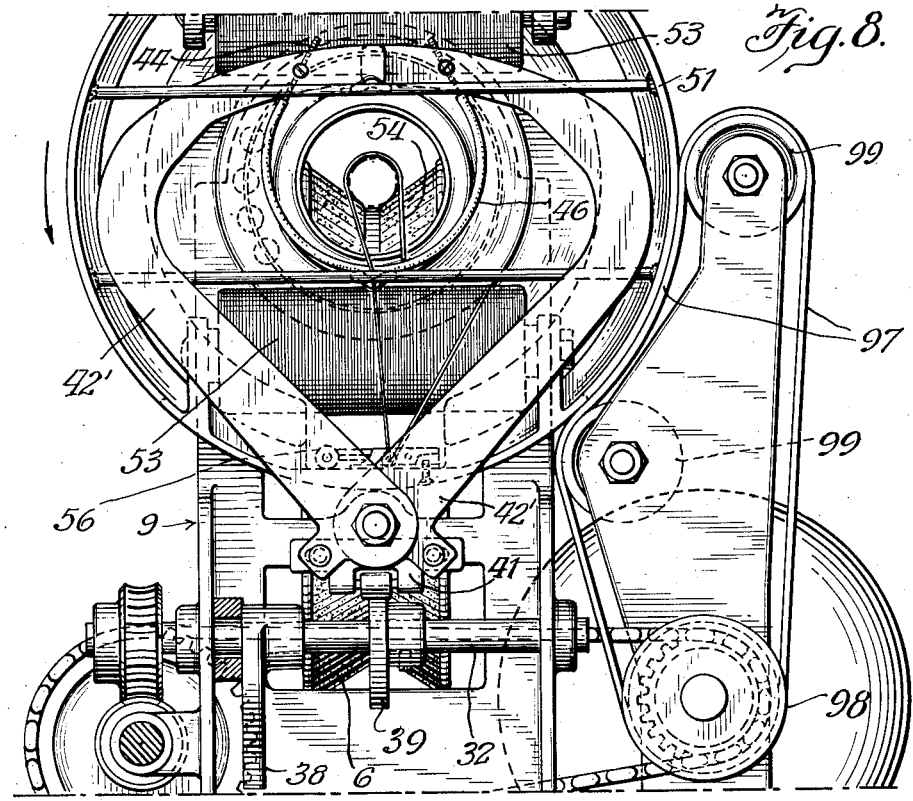
Fig. 8 is a view corresponding to Fig. 3, but of a modified form of the invention.

Although this invention may take numerous forms, only two have been chosen for illustration, and in these two many of the features are identical. The sausage casing, either natural or made artificially in a cellulose product such as the substance known commercially as "Viskose", may be stuffed with suitable sausage meat by hand. The stuffed sausage casing is fed into the machine between vertically disposed guide rollers 5 and over an idler roller 6, preferably V-shaped on its periphery as shown, which is suitably journalled in standards 7. Such V-shaped rollers are usually made from two separate wheels. From the roller 6 the stuffed casing is passed through the tube 8 which is carried by standard 9. As the casing passes out of the tube it reaches the position of choking and tying. In starting the machine the casing will be drawn to this position by hand, but subsequently will be fed automatically in a manner to be described.

A motor 10, as well as all of the rest of the apparatus, is mounted on a suitable base 11 which is preferably portable so that it may be moved adjacent to or set on a table where the stuffed casing is ready to be linked. The motor 10 drives a shaft 12 carried by a suitable bearing 13. On the shaft 12 are keyed a gear 14 and a clutch plate 16. Slidably journalled in the end of the shaft 12 is a second shaft 17. This shaft carries a sleeve 18 and on which are mounted a pulley 19 and the second clutch plate 21, which is provided with a friction facing 22. The clutch plate 21 and pulley 19 are keyed to the sleeve 18, as by a screw 23, which may also be used to key the sleeve 18 to the shaft 17. The sleeve 18 is slidable longitudinally on the shaft 17, at least when the screw 23 is loosened, and its position with respect to the shaft is determined by adjustable collar 24 screwed onto the end of the sleeve 18 and abutting against or otherwise connected to a collar 26. The collar 26 and, as illustrated, the adjacent shoulder of the shaft 17, abut against grooved cam 27. The stub 28 of the shaft 18 may ride in the groove of the cam. The sleeve 18 is urged against the cam 27 by a spring 29, thereby separating the clutch plates. With the clutch thus disengaged, the shaft 17, sleeve 18 and pulley 19 all remain idle. When the high portion 28 of cam 27 strikes the collar 26, it slides the sleeve 18 to the right, causing the clutch to engage. The pulley 19 is then rotated through the clutch by the shaft 12. This pulley drives the tying drum, as is described below.

As seen best in Figs. 3 and 2, the cam 27 is mounted on cam shaft 32 which is driven, through a worm wheel 33 carried on the shaft 32, by a worm gear 34. The worm gear 34 is keyed on a shaft 36 on which is also keyed a gear 37 which meshes with gear 14 on shaft 12. It is thus seen that the shaft 12 constantly drives the cam shaft 32 and the cams mounted thereon. These cams include, in addition to the cam 27, a conveyor-actuating cam 38 which will hereafter be called simply the feeding cam, and the cam 39 which actuates the choking device and will hereafter be called the choking cam.

Choking apparatus

Assuming that the parts are in the positions shown in Fig. 2, it will be observed that the sausage casing has been moved into the position for a choking operation to start. The choking cam 39 thrusts upwardly the thrust bar 41 which is carried on bell cranks 42 by means of pins on the bell crank operating in slots on the thrust bar, as illustrated best in Fig. 3. As the thrust bar 41 rises it operates the bell cranks 42 from the position shown in full lines in Fig. 3 to the position shown in dotted lines. The bell cranks may be pivoted to brackets 43 on standard 9. Connected to the upper ends of the bell crank levers 42 is a length of coiled spring 44 having small convolutions and covered with a rubber hose 46. A cable or other flexible strip could be used in place of the spring 44, but with the spring less accurate adjustment is necessary. As the bell crank levers are operated to the dotted line positions, the rubber-covered spring 44 is drawn to its dotted line position, thus choking the sausage, as illustrated. By varying the tension on the spring, the tightness of the choking can be controlled. It should, of course, be tight enough to substantially close the constriction, and it should be sufficiently yielding not to tear the casing.

Tying apparatus

The main portion of the tying apparatus is the drum 51, seen best in Figs. 2 and 3, which is rotatably mounted on the standard 9, as by suitable bearings 52. One or more spools 53 of suitable string 54 are carried by this drum and rotatable with respect thereto to permit the string to unwind. Before the initial choking operation takes place, the string from the roll to be used is drawn through the tension device 56, through a guide eye 57, and through the looped choking spring 44. The loose end may be held by hand during the first tying operation, but thereafter no holding is necessary, since there are no loose ends. The choking spring 44 holds the string at the position of the tie as it constricts the casing. When the casing has been constricted, the cam 27 rotates so that its high portion 28 strikes the collar 26 and causes the clutch plates 21 and 16 to engage so that, as described before, a pulley 19 is rotated by the shaft 12. A driving belt 59 extends around the pulley 19 and around a pulley 61 formed on the drum 51, so that the drum 51 is driven by the motor in response to the control exerted by the cam 27. As the drum 51 rotates it wraps the string around the constricted portion of the casing adjacent to the spring 44. When the constricted portion of the casing is tied with the desired number of convolutions of string 54, the drum 51 stops by virtue of the fact that the clutch plates 21 and 16 become disengaged under control of the cam 27. If desired, the drum 51 may be stopped automatically at any desired point. There are preferably three convolutions, since it has been found that with this number one of the last two convolutions is pretty sure to fall over the first and hold it against unwinding. When the string on one of the balls carried in the drum is used, the string on the other ball may be pulled to position without undue delay and the tying operation continued.

The tension of the string is regulated to make the ties sufficiently tight by means of a tensioning device shown in release position in Fig. 3 and in operated position in Fig. 4. The string 54 passes over a pivoted tension lever 63 which is pivoted to a bracket 56, as illustrated. As the drum rotates, the tension lever 63 is urged to the position shown in full lines in Fig. 4 by centrifugal force. This force not only varies with the speed of the drum, but may also be controlled for any given speed by shifting the weight 64 along the lever 63. The lever 63 presses the string 54 against a block 66 which may be the top of the bracket 56, the amount of centrifugal force determining the amount of frictional tension applied to the string 54. This tensioning device provides a very simple expedient for controlling the movement of the string. Inasmuch as the tension bar 63 is simply pivoted to the bracket, there is almost no likelihood of sticking, jamming or other interruptions, and with the device operating only when the drum rotates in a tying operation, positive operation of the device as a whole is assured.

Feeding apparatus

As the rotation of the drum ceases, the feed cam 38 rotates against the follower roller 68, as seen best in Figs. 2a and 5. The follower roller 68 is carried by a reciprocating feed bar 69 which slides in a suitable guideway 71 mounted on a standard 72. Secured on a reciprocating feed bar 69 are lugs 73 which engage a roller 74 mounted on the crank bar 76. The crank bar 76 is rotatably mounted on and is rotatable with respect to a shaft 77 on which is also carried a ratchet wheel 78 which is keyed to the shaft. Pivoted on the upper end of crank bar 76 is a pawl 79 for operating the ratchet wheel 78, the reverse movement of which may be prevented by an additional stationary pawl if desired. Return movement of the feed bar 69 is effected by spring 80 and is adjustably limited by a cam 81 which is locked in any desired position by a thumb screw 82.

The shaft 77 is journaled in spaced brackets 84 between which is located the feed roll 86 keyed on the shaft 77 and preferably having a V-shaped periphery, as illustrated. This feed roller is driven through the ratchet wheel 78 by the reciprocating bar 69, and therefore the angle through which the feed roll 86 rotates at each movement, being proportional to the length of the stroke of the bar 69, is controlled by adjusting the cam 81.

To prevent the sausages from slipping on the feed roll 86, a pair of pressure rollers 88 and 89 is provided, these rollers being rotatably mounted on pivoted links 91. These rollers may be coated with a corrugated rubber or may carry a belt extending between and around them. The roller 88, as well as the roller 89 if desired, is driven as by a spring-driving belt 92 extending around a pulley 93 keyed to the shaft 95 to which the pressure roller 88 is also keyed and around a pulley 94 on the shaft 77. A spring belt is preferred, since at the same time that it drives the pressure roller it serves the purpose of providing the proper pressure on the roll while permitting it to recede if slightly larger sausages are run.

Summary of operation

After the stuffed casing has been fed between the guide rolls 5, over the idler roll 6, through the tube 8 and through the looped spring 44, and after the string 54 has also been drawn through the looped spring 44, the machine is started and the choking cam 39 operates the bell crank levers 42 to draw the choke spring 44 to the choking position shown in dotted lines in Fig. 3, thereby constricting the stuffed casing to form a frankfurter at the advanced side of the constriction. Thereupon, cam 27 causes the engagement of the clutch 16 to drive the drum 51 which carries the spools of string around the casing, winding the string around the constricted portion of the casing, to tie the same. As the drum 51 stops the feed cam 38 operates the reciprocating bar 69 to cause rotation of the feed roll 86, the reciprocating bar 69 operating through the pawl 79 and ratchet wheel 78. The length of the feeding step is determined by the cam 81 which controls the return movement of bar 69. As the feed roll 86 comes to rest, the cycle begins over.

Modification

Figure 9:
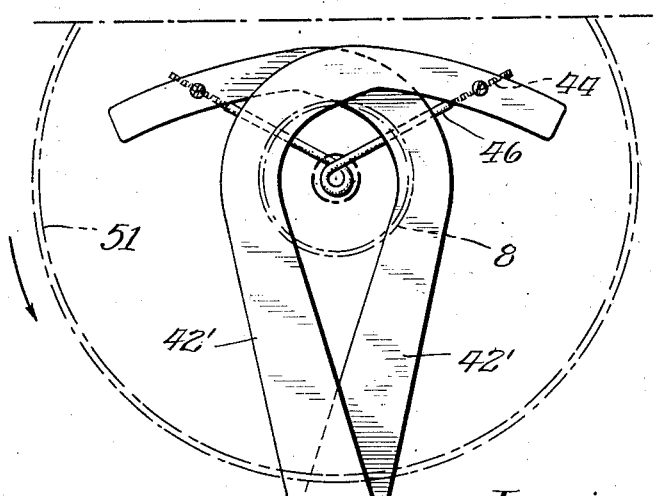
Fig. 9 is a detailed view of the choking apparatus of Fig. 8 in operated position.

The principle of the modification shown in Figs. 8 and 9 is the same as that already described. The choking device works in the opposite direction, however, the choking cam 39 shifting the bell crank levers 42' from the position shown in Fig. 8 to the position shown in Fig. 9.

In this modification the driving means for the drum 51 has been illustrated as a belt 97 driven by a pulley 98 and carried by pulleys 99 in contact with a portion of the drum 51, as shown. It should be realized that either form of the choking device and either form of drive may be used with any of the other features.

From the foregoing, it is evident that both forms of this invention will satisfactorily link sausages by constricting the casing at the desired point, in a manner which avoids breakage thereof, and by tying the constrictions with string to prevent the return of the constriction to its original shape. The strains and waste of casing due to twisting are avoided. As a result, this invention has proved very satisfactory in commercial use.

I have described my invention in detail so that those skilled in the art will understand the manner in which the same is practiced. My invention is limited, however, only by the appended claims.

I claim:

1. A sausage linking machine including a flexible band, means for drawing said band into a small closed loop around a stuffed casing to choke said casing to form a constriction therein, and means rotating around said casing for wrapping a string around said constriction.

2. A sausage linking machine including a flexible band, means for drawing said band into a small closed loop around a stuffed casing to choke said casing to form a constriction therein, means rotating around said casing for wrapping a string around said constriction, and means for feeding said casing the desired length of the sausages.

3. A sausage linking machine including a pair of spaced conveying rollers adapted to support a stuffed sausage casing therebetween, means for driving one of said rollers with a step by step movement to feed said sausage casing accordingly to stationary linking mechanism, said mechanism including a flexible loop-forming strip surrounding said casing between said rollers, means for drawing said loop tightly around said casing between feeding movements to form a constriction therein, and means for securing said constriction by applying securing means thereto.

4. A sausage linking machine including a pair of spaced conveying rollers adapted to support a stuffed sausage casing therebetween, means for driving one of said rollers with a step by step movement to feed said sausage casing accordingly, a flexible loop-forming strip surrounding said casing between said rollers, means for drawing said loop tightly around said casing between feeding movements to form a constriction therein, means for securing said constriction comprising a drum surrounding said casing and adapted to carry a supply of string, and means for rotating said drum after said constriction has been formed to wrap said string around said constriction.

5. Apparatus for choking a stuffed sausage for forming a constriction therein comprising a flexible strip, means for drawing said strip tightly around said casing, and a soft covering on said strip to protect said casing.

6. Apparatus for choking a stuffed sausage for forming a constriction therein comprising a length of coiled spring having small convolutions, and means for drawing said spring tightly around said casing.

7. Apparatus for choking a stuffed sausage for forming a constriction therein comprising a length of coiled spring having small convolutions, means for drawing said spring tightly around said casing, and a soft covering on said spring to protect said casing.

8. Apparatus for tying a constricted sausage casing comprising a drum rotatably mounted around said casing, means to hold a supply of string, said means being carried by said drum, means to rotate said drum, means to hold said string on the constricted portion of the casing, and a centrifugally operated tensioning device through which said string passes, said device releasing said string when the drum stops.

9. A sausage linking machine including means for advancing a stuffed casing with a step by step movement, means for constricting said casing between movements thereof, and tying means carrying a length of string and rotated around said casing between movements thereof to wind said string around the constricted portion of the casing, said tying means including a centrifugally operated string-tensioning device which releases the string when the tying means stops, whereby the string may be drawn out freely as said stuffed casing is moved.

10. A sausage linking machine including a flexible band, means for drawing said band into a small closed loop around a stuffed casing to choke said casing to form a constriction therein, means rotating around said casing for wrapping a string around said constriction, and means for feeding said casing the desired length of the sausages, said feeding means being adjustable to vary the length of the sausages without affecting the other means named.

11. In a sausage casing tying device, conveying apparatus for said casings, a drum rotatably mounted in a position whereby said casings are conveyed therethrough, means carried by said drum to hold a supply of string, and centrifugally operated means for releasably holding said string, including a weighted arm pivoted within the drum to hold said string upon rotation of the drum and release said string when the drum stops.

12. Apparatus for choking a stuffed sausage for forming a constriction therein comprising a length of coiled spring having small convolutions, means for drawing said spring tightly around said casing, and a soft covering on said spring to protect said casing, said covering surrounding but being unsecured to said spring whereby said spring may be stretched without stretching said covering.

13. A sausage linking machine including a pair of spaced conveyors adapted to support a stuffed sausage casing therebetween and to feed the same with a step-by-step movement, and linking mechanism located between said conveyors and including a flexible loop-forming strip having a rubber contact portion and elastic draw portions, means for drawing said strip by said draw portions to form said contact portion in a loop tightly surrounding said casing between feeding movements of said casing to form a constriction therein, and means rotating around said casing for wrapping a string around said constriction and including a tensioning device for maintaining the proper tension on said string as it is being wrapped.

14. A choking mechanism for forming a constriction in a sausage casing comprising a flexible resilient member adapted to encircle the casing, and supporting and drawing means for said member movable to tighten the same about the casing.

15. A sausage linking mechanism for forming and securing constrictions in a sausage casing, comprising a flexible loop forming strip, means for moving a stuffed sausage casing lengthwise past said strip, means for drawing the strip in a loop about the sausage casing at spaced intervals throughout the length of the casing to form constrictions therein, and means for winding the string about the constrictions formed by said loop, said sausage casing conveying the unwound string through the loop by means of the coils of string formed at said constrictions.

16. A sausage linking mechanism for forming and securing constrictions in a sausage casing, comprising a flexible loop forming strip, means for moving a stuffed sausage casing lengthwise past said strip, means for drawing the strip in a loop about the sausage casing at spaced intervals throughout the length of the casing to form constrictions therein, and means for winding the string about the constrictions formed by said loop, said sausage casing conveying the unwound string through the loop by means of the coils of string formed at said constrictions, said winding means including a tensioning device operating in response to the starting and stopping of the winding means to apply tension on the string during winding and release the applied tension at the end of the winding operation.

17. A sausage linking mechanism for forming and securing constrictions in a sausage casing, comprising a flexible loop forming strip, means for moving a stuffed sausage casing lengthwise past said strip, means for drawing the strip in a loop about the sausage casing at spaced intervals throughout the length of the casing to form constrictions therein, and means for winding the string about the constrictions formed by said loop, said sausage casing conveying the unwound string through the loop by means of the coils of string formed at said constrictions, said winding means including a tensioning device operating in response to the starting and stopping of the winding means to apply tension on the string during winding and release the applied tension at the end of the winding operation.

18. A choking mechanism for choking a stuffed sausage to form a constriction therein comprising an elastic strip, and means for causing said strip to encircle and squeeze a stuffed sausage casing.

19. A sausage linking mechanism for forming and securing constrictions in a stuffed sausage casing comprising an elastic strip, means for causing said strip to encircle and squeeze a stuffed sausage casing, and means for winding a string about the casing in the constriction formed by said elastic strip.

20. A sausage linking mechanism for forming and securing constrictions in a stuffed sausage casing comprising an elastic strip, means for causing the strip to encircle and squeeze a stuffed sausage casing at spaced intervals throughout the length of the casing, and means for successively winding a string about the constrictions formed by said strip.

LOUIS A. MOLIN.